Patented Apr. 27, 1954

2,676,969

UNITED STATES PATENT OFFICE 2,676,969

METHOD OF THIOLIZATION OF PYRIDINE COMPOUNDS

Erwin Klingsberg, New Brunswick, and Domenick Papa, Bloomfield, N. J., assignors to Schering Corporation, Bloomfield, N. J., a corporation of New Jersey No Drawing. Application November 24, 1950, Serial No. 197,484

3 Claims. (Cl. 260—294.8)

This invention relates to a method for the preparation of organic mercaptans from the corresponding hydroxy compounds, particularly from carbonyl compounds having a tautomeric hydroxy form. Because of the speed and ease of the reaction at relatively low temperatures, the method of the invention is particularly suitable for the production of the otherwise difficultly accessible halogenated mercaptopyridines.

An object of the invention is the provision of a method for the thiolization of organic hydroxy compounds.

A further object of the invention is the provision of a method for the conversion of halogenated, particularly chlorinated, brominated and iodinated, pyridones to the corresponding mercaptopyridines.

We have found that by heating organic carbonyl compounds having a tautomeric hydroxy form with phosphorus pentasulfide in the presence of a pyridine base, such as pyridine, the picolines, the lutidines, quinoline and mixtures thereof, the hydroxyl group is readily converted into a mercaptan group in relatively high yield. A particularly valuable feature of the invention is that, in general, the reactants and reaction products are soluble in the pyridine bases so that the reaction takes place in a homogeneous liquid medium, while the desired mercaptan product is readily separated in relatively pure form by diluting the reaction mixture with several volumes of water.

The following are typical examples illustrating the principles of the invention:

*Example I.—3,5-diiodo-4-mercaptopyridine*

140 g. of 3,5-diiodo-4-pyridine, 110 g. of $P_2S_5$, and 160 ml. of pyridine are refluxed for 1½ hours and then poured into approximately 4 l. of hot water. The desired mercaptan separates and after thorough chilling is filtered and washed with methanol, yielding 140 g. of yellow solid. M. P. 195° C.

*Example II.—3,5-diiodo-2-mercaptopyridine*

2.8 g. of 3,5-diiodo-2-pyridone and 3.4 g. of $P_2S_5$ are refluxed for 2 hours in 75 ml. of pyridine. On working up in the manner described in Example I, the mercaptan is obtained. M. P. 204° C. When analytically pure, this substance melts at 207° C.

*Example III.—Thiobenzanilide*

14 g. of benzanilide and 17 g. of $P_2S_5$ are refluxed for 40 minutes in 70 ml. of pyridine and the reaction mixture is poured into water. The gum formed slowly crystallizes. Crystallization may be accelerated by the addition of a little potassium hydroxide solution. The crude product, on dissolving in alkali and reprecipitating with HCl, gives 11 g. of thiobenzanilide, melting at 96–96.5° C.

*Example IV.—1,3-dimethyl-2,4-dithiouracil*

A mixture of 5 g. of 1,3-dimethyluracil and 6 g. of $P_2S_5$ in 25 cc. of pyridine is refluxed for several hours. The reaction mixture is poured into a mixture of ice and water and the dithiouracil is recovered by filtration. Melting point 131–133° C.

*Example V.—2,4-dithiouracil*

2,4-dithiouracil, melting point 231° C. is prepared by substituting uracil for the dimethyluracil in the procedure of Example IV.

We claim:

1. A method of making halogenated mercaptopyridines which comprises heating a pyridone of the group consisting of 3,5-dichloro-, 3,5-dibromo- and 3,5-diiodo-2- and 4-pyridones with phosphorus pentasulfide in the presence of a pyridine base of the group consisting of pyridine, lower alkyl pyridines and quinoline.

2. A method of making 3,5-diiodo-4-mercaptopyridine which comprises refluxing a solution of 3,5-diiodo-4-pyridone and phosphorus pentasulfide in pyridine.

3. A method of making 3,5-diiodo-2-mercaptopyridine which comprises refluxing a solution of 3,5-diiodo-2-pyridone and phosphorus pentasulfide in pyridine.

References Cited in the file of this patent

UNITED STATES PATENTS

| Number | Name | Date |
|---|---|---|
| 2,276,975 | Howland | Mar. 17, 1942 |
| 2,349,179 | Kunetut | May 16, 1944 |
| 2,356,569 | De Smet | Aug. 22, 1944 |

OTHER REFERENCES

Maier, "Das Pyridin und seine derivate," 1934, p. 174.

King, Chemical Abstracts, vol. 33, p. 6314 (1939).